US012736649B2

(12) United States Patent
Zorgui et al.

(10) Patent No.: US 12,736,649 B2
(45) Date of Patent: Sep. 15, 2026

(54) ROUND-TRIP PHASE RANGING IN THE PRESENCE OF DEEP FADE

(71) Applicant: QUALCOMM INCORPORATED, San Diego, CA (US)

(72) Inventors: Marwen Zorgui, San Diego, CA (US); Sony Akkarakaran, Poway, CA (US); Yiyue Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 18/748,346

(22) Filed: Jun. 20, 2024

(65) Prior Publication Data

US 2025/0389834 A1 Dec. 25, 2025

(51) Int. Cl.
*G01S 11/06* (2006.01)
*H04B 17/391* (2015.01)
*H04W 64/00* (2009.01)

(52) U.S. Cl.
CPC .......... *G01S 11/06* (2013.01); *H04B 17/3911* (2015.01); *H04W 64/006* (2013.01)

(58) Field of Classification Search
CPC ........ G01S 11/06; G01S 7/358; G01S 13/825; G01S 13/84; G01S 7/006; H04B 17/3911; H04W 64/006
See application file for complete search history.

(56) References Cited

U.S. PATENT DOCUMENTS

2021/0373149 A1 12/2021 Zand et al.
2022/0066019 A1* 3/2022 Waheed .................. G01S 13/84
2022/0171047 A1 6/2022 Ryan et al.
(Continued)

FOREIGN PATENT DOCUMENTS

WO WO-2021155210 A1 * 8/2021 ........... G01S 5/0244

OTHER PUBLICATIONS

K. M. Yusof, J. Woods and S. Fitz, "Range estimation based on a deep fade linearity function," 2012 International Symposium on Telecommunication Technologies, Kuala Lumpur, Malaysia, 2012, pp. 142-146 (Year: 2012).*
(Continued)

*Primary Examiner* — Charles N Appiah
(74) *Attorney, Agent, or Firm* — Weaver Austin Villeneuve & Sampson LLP

(57) ABSTRACT

A method for determining a range estimate includes: transmitting, from a first apparatus, a plurality of first signals with respective frequencies spanning a frequency band; receiving first phase measurement information, from a second apparatus; receiving, at the first apparatus from the second apparatus, a plurality of second signals with respective frequencies; measuring, at the first apparatus, phase of each of the plurality of second signals to obtain second phase measurement information; determining a plurality of product channels by multiplying the first phase measurement information by the second phase measurement information; determining at least one deep-fade frequency; determining a plurality of sub-bands based on the at least one deep-fade frequency; determining a plurality of root channels corresponding to the plurality of sub-bands; and determining the range estimate based on the plurality of root channels.

20 Claims, 8 Drawing Sheets

(56) References Cited

U.S. PATENT DOCUMENTS

| | | | | |
|---|---|---|---|---|
| 2022/0394424 | A1 | 12/2022 | Li et al. | |
| 2023/0022613 | A1* | 1/2023 | Romme | H04B 17/101 |
| 2024/0113792 | A1 | 4/2024 | Stanciu et al. | |
| 2024/0323903 | A1* | 9/2024 | Ghimire | G01S 11/10 |
| 2024/0389062 | A1* | 11/2024 | Xie | H04W 4/02 |

OTHER PUBLICATIONS

International Search Report and Written Opinion—PCT/US2025/027228—ISA/EPO—Aug. 4, 2025.

* cited by examiner

ROUND-TRIP PHASE RANGING IN THE PRESENCE OF DEEP FADE

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc.

It is often desirable to know the relative distance from one device to another. The relative range itself may be useful and/or the relative range may be used (e.g., in combination with a known location of another device and/or in combination with one or more other range measurements) to determine location and/or motion (e.g., speed or velocity) of a user equipment (UE), e.g., a cellular phone, with the terms "location" and "position" being synonymous and used interchangeably herein. For example, location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications. Various techniques may be used to determine the range from a UE to another device and/or to determine a location of a UE.

SUMMARY

An example method for determining a range estimate includes: transmitting, from a first apparatus, a plurality of first signals with each having a respective frequency of a plurality of frequencies spanning a frequency band of interest; receiving first phase measurement information at the first apparatus from a second apparatus, the first phase measurement information corresponding to a phase measurement of each of the plurality of first signals; receiving, at the first apparatus from the second apparatus, a plurality of second signals with each having a respective frequency of the plurality of frequencies; measuring, at the first apparatus, phase of each of the plurality of second signals to obtain second phase measurement information; determining a plurality of product channels, corresponding to the plurality of frequencies, by multiplying the first phase measurement information by the second phase measurement information for each of the plurality of frequencies; determining at least one deep-fade frequency, of the plurality of frequencies, that corresponds to deep fading; determining a plurality of sub-bands within the frequency band of interest based on the at least one deep-fade frequency; determining a plurality of root channels each corresponding to a respective one of the plurality of sub-bands; and determining the range estimate based on the plurality of root channels, the range estimate being an estimate of a distance between the first apparatus and the second apparatus.

An example first apparatus includes: at least one transceiver; at least one memory; and at least one processor, communicatively coupled to the at least one transceiver and the at least one memory, configured to: transmit, via the at least one transceiver, a plurality of first signals with each having a respective frequency of a plurality of frequencies spanning a frequency band of interest; receive, via the at least one transceiver, first phase measurement information at the first apparatus from a second apparatus, the first phase measurement information corresponding to a phase measurement of each of the plurality of first signals; receive, via the at least one transceiver from the second apparatus, a plurality of second signals with each having a respective frequency of the plurality of frequencies; measure phase of each of the plurality of second signals to obtain second phase measurement information; determine a plurality of product channels, corresponding to the plurality of frequencies, by multiplying the first phase measurement information by the second phase measurement information for each of the plurality of frequencies; determine at least one deep-fade frequency, of the plurality of frequencies, that corresponds to deep fading; determine a plurality of sub-bands within the frequency band of interest based on the at least one deep-fade frequency; determine a plurality of root channels each corresponding to a respective one of the plurality of sub-bands; and determine a range estimate based on the plurality of root channels, the range estimate being an estimate of a distance between the first apparatus and the second apparatus.

Another example first apparatus includes: means for transmitting a plurality of first signals with each having a respective frequency of a plurality of frequencies spanning a frequency band of interest; means for receiving first phase measurement information from a second apparatus, the first phase measurement information corresponding to a phase measurement of each of the plurality of first signals; means for receiving, from the second apparatus, a plurality of second signals with each having a respective frequency of the plurality of frequencies; means for measuring phase of each of the plurality of second signals to obtain second phase measurement information; means for determining a plurality of product channels, corresponding to the plurality of frequencies, by multiplying the first phase measurement information by the second phase measurement information for each of the plurality of frequencies; means for determining at least one deep-fade frequency, of the plurality of frequencies, that corresponds to deep fading; means for determining a plurality of sub-bands within the frequency band of interest based on the at least one deep-fade frequency; means for determining a plurality of root channels each corresponding to a respective one of the plurality of sub-bands; and means for determining a range estimate based on the plurality of root channels, the range estimate being an estimate of a distance between the first apparatus and the second apparatus.

An example non-transitory, processor-readable storage medium includes processor-readable instructions to cause at least one processor of a first apparatus to: transmit a plurality of first signals with each having a respective frequency of a plurality of frequencies spanning a frequency band of interest; receive first phase measurement information from a second apparatus, the first phase measurement information corresponding to a phase measurement of each of the plurality of first signals; receive, from the second apparatus, a plurality of second signals with each having a respective frequency of the plurality of frequencies; measure phase of each of the plurality of second signals to obtain second phase measurement information; determine a plurality of product channels, corresponding to the plurality of frequencies, by multiplying the first phase measurement information by the second phase measurement information for each of the plurality of frequencies; determine at least one deep-fade frequency, of the plurality of frequencies, that corresponds to deep fading; determine a plurality of sub-bands within the frequency band of interest based on the at least one deepfade frequency; determine a plurality of root channels each corresponding to a respective one of the plurality of sub-bands; and determine a range estimate based on the plurality of root channels, the range estimate being an estimate of a distance between the first apparatus and the second apparatus.

DETAILED DESCRIPTION

Techniques are discussed herein for performing ranging between devices. For example, techniques are provided for BLUETOOTH® Channel Sounding for Round-Trip Phase ranging between devices. An initiator device may transmit first ranging signals of different frequencies and a reflector device may receive and measure (e.g., a phase of each of) the first ranging signals. The reflector device may report the phase measurements and/or one or more values (e.g., Phase Correction Terms (PCTs)) based on the phase measurements. The reflector device may transmit second ranging signals of the same frequencies as the first ranging signals, and the initiator device may receive and measure (e.g., a phase of each of) the second ranging signals and derive one or more values (e.g., PCTs) based on the measurements of the second ranging signals. A product channel may be determined, e.g., by the initiator device, based on the measurements (e.g., based on the PCTs) of the first and second ranging signals. The product channel may be analyzed to determine frequencies corresponding to deep fade (significant destructive addition) of ranging signals due to multipath. A frequency range corresponding to the ranging signals, and thus the product channel, may be divided into sub-bands based on the frequencies of deep fade. A root channel may be determined for each of the sub-bands, and these root channels used to determine a range estimate for a range between the initiator device and the reflector device. These are example implementations, and other example implementations may be used.

Items and/or techniques described herein may provide one or more of the following capabilities, as well as other capabilities not mentioned. Ranging accuracy, e.g., of Round-Trip Phase ranging, may be improved in the presence of one or more deep fade conditions. BLUETOOTH® ranging may be enabled. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
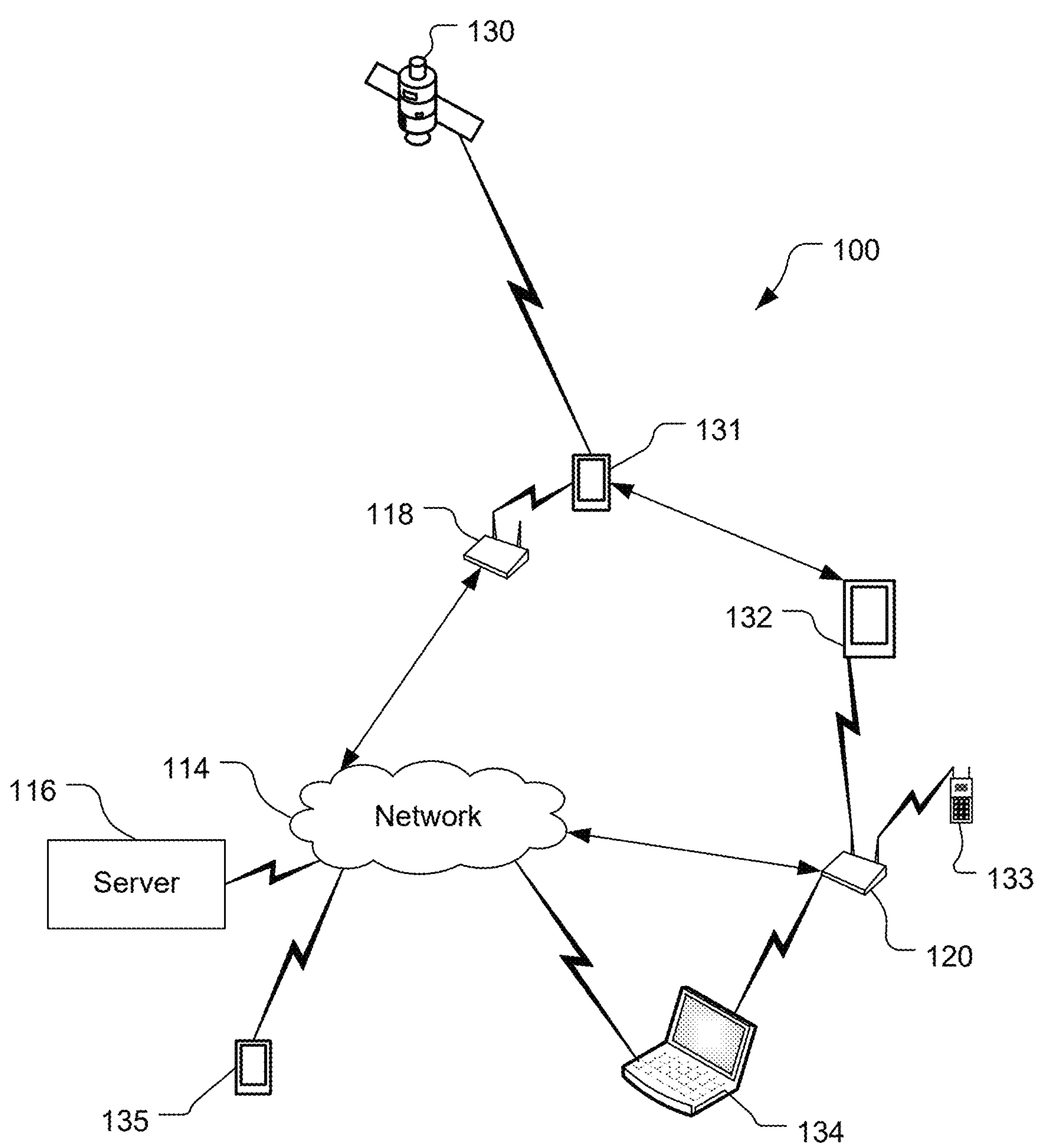
FIG. 1 is a schematic diagram of a communication system.

Referring to FIG. 1, a communication system 100 includes UEs 131, 132, 133, 134, 135 (user equipments), a network 114, a server 116, access points (APs) 118, 120, and a satellite 130. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The UEs 131-135 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the UEs 131-135, network 114, server 116, and/or APs 118, 120. For example, such other devices may include internet of thing (IoT) devices, medical devices, home entertainment and/or automation devices, automotive devices, etc. The UEs 131-135 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), BLUETOOTH® communication, etc.). The satellite 130 is one of multiple satellites making up one or more Satellite Positioning Systems (SPS) such as the Global Positioning System (GPS). One or more of the UEs 131-135 include appropriate components (e.g., one or more antennas) for signal transfer with other devices in the system 100, e.g., one or more antennas for receiving signals from the satellite 130 and/or one or more antennas for transmitting signals to and/or receiving signals from other ones of the UEs 131-135 and/or one or more of the APs 118, 120.

As used herein, the term "user equipment" and "UE" are not specific to or otherwise limited to any particular Radio Access Technology (RAT), unless otherwise noted. In general, UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on. Further, two or more UEs may communicate directly in some configurations with or without passing information to each other through a network.

Figure 2:
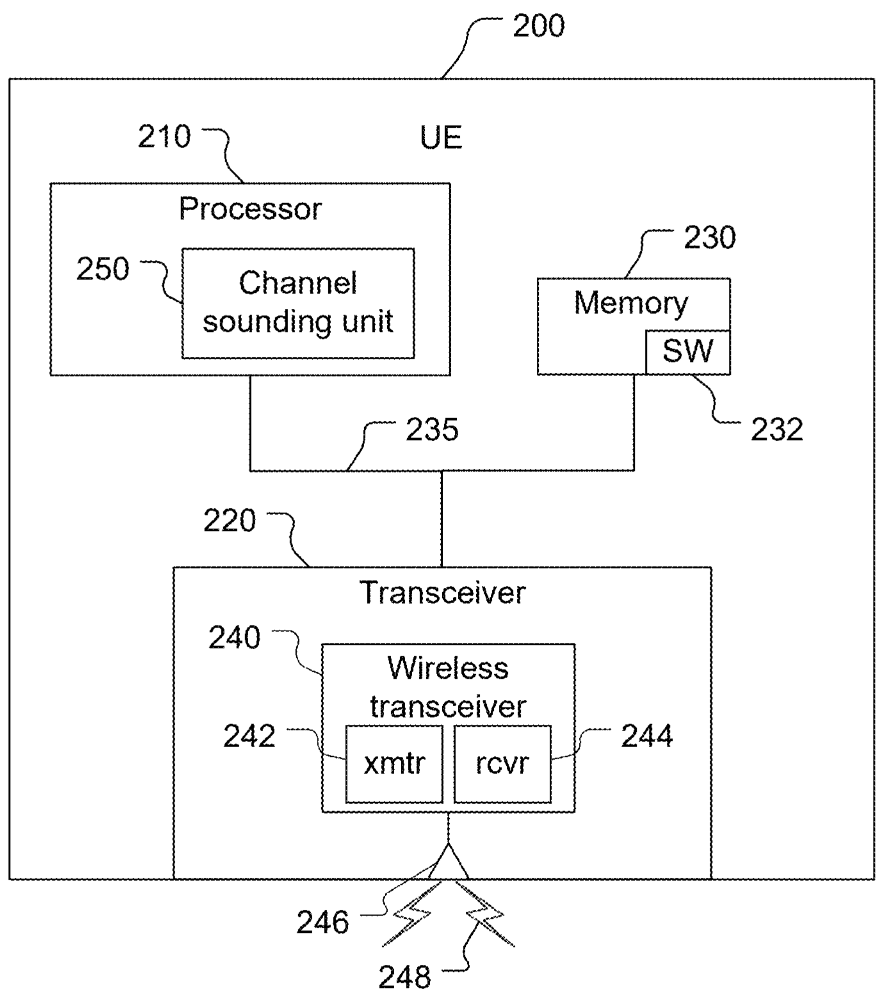
FIG. 2 is a block diagram of an example user equipment shown in FIG. 1.

Referring also to FIG. 2, a UE 200, which is an example of the UEs 131-135, includes a processor 210, a transceiver 220, and a memory 230 communicatively coupled to each other by a bus 235. The UE 200 may include one or more other components not shown in FIG. 2. Even if referred to in the singular, the processor 210 may include one or more processors, and the memory 230 may include one or more memories. Even if referred to in the singular, the processor 210 may include one or more processors, the transceiver 220 may include one or more transceivers (e.g., one or more transmitters and/or one or more receivers), and the memory 230 may include one or more memories.

The transceiver 220 may include a wireless transceiver 240 configured to communicate with other devices through wireless connections (and may also include a wired transceiver (not shown) configured to communicate through wired connections). For example, the wireless transceiver 240 may include a wireless transmitter 242 and a wireless receiver 244 coupled to an antenna 246 for transmitting (e.g., on one or more uplink channels (transmission paths) and/or one or more sidelink channels) and/or receiving (e.g., on one or more downlink channels and/or one or more sidelink channels) wireless signals 248 and transducing signals from the wireless signals 248 to guided (e.g., electrical and/or optical) signals and from guided (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), BLUETOOTH®, Zigbee®, etc. New Radio may use mm-wave frequencies and/or sub-6 GHZ frequencies.

The processor 210 may include one or more hardware devices, e.g., a central processing unit (CPU), a microcontroller, an application specific integrated circuit (ASIC), etc. The processor 210 may comprise multiple processors including a general-purpose/application processor, a Digital Signal Processor (DSP), and/or one or more other processors.

The memory 230 may be a non-transitory, processor-readable storage medium that may include random access memory (RAM), flash memory, disc memory, and/or read-only memory (ROM), etc. The memory 230 may store software 232 which may be processor-readable, processor-executable software code containing instructions that may be configured to, when executed, cause the processor 210 to perform various functions described herein. Alternatively, the software 232 may not be directly executable by the processor 210 but may be configured to cause the processor 210, e.g., when compiled and executed, to perform the functions. The processor 210 may include a memory with stored instructions in addition to and/or instead of the memory 230.

The description herein may refer to the processor 210 performing a function, but this includes other implementations such as where the processor 210 executes instructions of software and/or firmware. The description herein may refer to the processor 210 performing a function as shorthand for one or more processors performing the function. The description herein may refer to the UE 200 performing a function as shorthand for one or more appropriate components of the UE 200 performing the function. The processor 210 (possibly in conjunction with the memory 230 and, as appropriate, the transceiver 220) includes a channel sounding unit 250. The configuration and functionality of the channel sounding unit 250 is discussed further herein, with the UE 200 being configured to perform the functionality described as being performed by the channel sounding unit 250.

The channel sounding unit 250 is configured to perform one or more channel sounding techniques to determine a range between the UE 200 and another device. Channel sounding techniques may be used to determine a range between the UE 200 and another device. For example, the UEs 131, 132 may be configured to perform BLUETOOTH® Channel Sounding (BCS) (previously known as High-Accuracy Distance Measurement (HADM) to determine a range between the UEs 131, 132. While the discussion herein focuses on BLUETOOTH® Channel Sounding, and ranging between UEs, the discussion is applicable to channel sounding with other radio access technologies (including non-BLUETOOTH® frequencies) and ranging between a UE and a non-UE device. The discussion herein may provide an additional feature to BLUETOOTH®, namely ranging, that has not been available with BLUETOOTH®. BCS may work in the ISM band (2402 MHz to 2480 MHz), allow for 1 Msym/s (LE 1M) and 2 Msym/s (LE 2M) modes, work with one or more antennas, and involve half-duplex transmissions.

As discussed herein, the UE 200, such as either of the UEs 131, 132, may be configured to determine distance accurately between the UE 200 and another device. For example, the UE 131 may use BLE (BLUETOOTH® Low Energy) technology and improve the accuracy of a distance measurement compared to prior BLE distance measuring techniques to determine a range to the UE 132. The determined distance between the UEs 131, 132 may be used for relative ranging, which may be used to determine a location of the UE 131 or a location of the UE 132. Channel sounding techniques include RTT (Round-Trip Time) ranging techniques and RTP (Round-Trip Phase) ranging techniques (also known as PBR (Phase-Based Ranging)).

RTP techniques may provide more accurate (more precise) ranging than RTT ranging techniques. Round-Trip Phase channel sounding allows for accurate estimation of distance between two radios. For example, with a cabled setup, no multi-path, stable temperature, and signal strength greater than or equal to −70 dBm, distance accuracy of ±10% may be achieved for distances greater than 5 m and distance accuracy of 0.5 m for distances less than or equal to 5 m.

Figure 3:
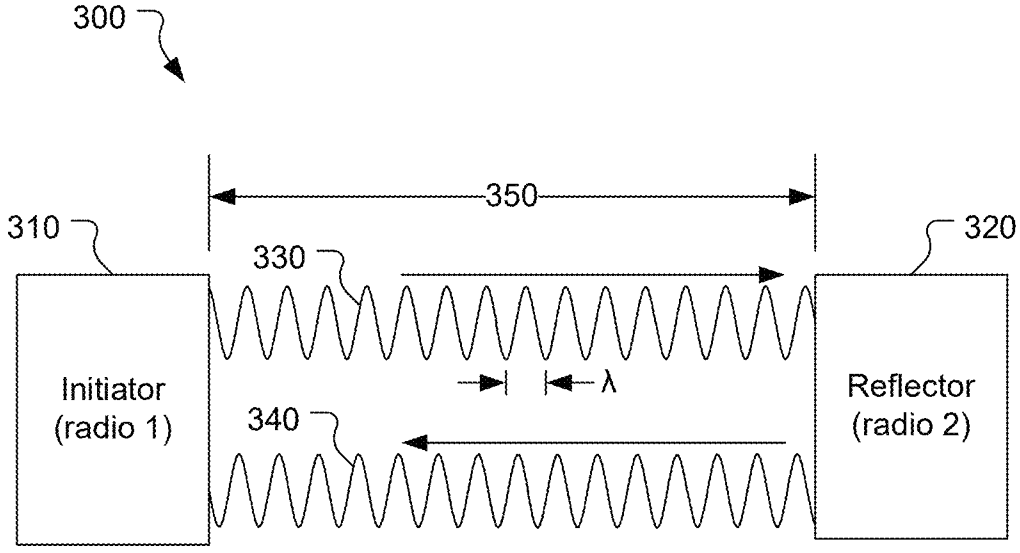
FIG. 3 is a block diagram of channel sounding signaling between an initiator device and a reflector device.

Referring also to FIG. 3, a channel sounding system 300 includes an initiator 310 and a reflector 320. Each of the initiator 310 and the reflector 320 is a device that may be an example of the UE 200, or may be another device (e.g., a base station, an access point, etc.). Each of the initiator 310 and the reflector 320 comprises a respective radio for transmitting and receiving signals, e.g., BLUETOOTH® signals. The initiator 310 and the reflector 320 may each include multiple antennas for channel sounding, which may provide more precise ranging than using a single antenna in each of the initiator 310 and the reflector 320. The initiator 310 and the reflector 320 are functional designations and may be temporary. For example, the initiator 310 may act as a reflector (e.g., at another time) and the reflector 320 may act as an initiator (e.g., at another time). The initiator 310 is configured to transmit a first signal 330 (a tone signal that is a sinusoid) and the reflector 320 is configured to transmit a second signal 340 (which may be called a reflected signal, and that is a tone signal that is a sinusoid) in response to receiving the first signal 330. The second signal 340 is not a reflection of the first signal 330, but may be thought of as a reflection because the second signal is transmitted by the reflector 320 based on the reflector 320 receiving the first signal 330. The combination of the transmissions and receptions of the signals 330, 340 is called a "step." The initiator 310, e.g., the channel sounding unit 250, transmits the first signal 330 (e.g., tones and/or data packets), receives the second signal 340, and collects phase and/or time measurement in real time. Further, the initiator 310 collects measurements made by the reflector 320 that are reported to the initiator 310, e.g., over a BLE communication link between the initiator 310 and the reflector 320. The reflector 320, e.g., the channel sounding unit 250, receives and measures (e.g., the phase of) the first signal 330 in real time, reports the measurement(s) of the first signal 330 to the initiator 310 (e.g., over a BLE communication link), and "reflects" the first signal 330 by transmitting the second signal 340 (e.g., tones and/or data packets) to the initiator 310. For RTP, the signals 330, 340 include at least one tone each. Measurements of both of the signals 330, 340 may be combined (e.g., multiplied) to cancel unknown noise to improve ranging precision.

Figure 4:
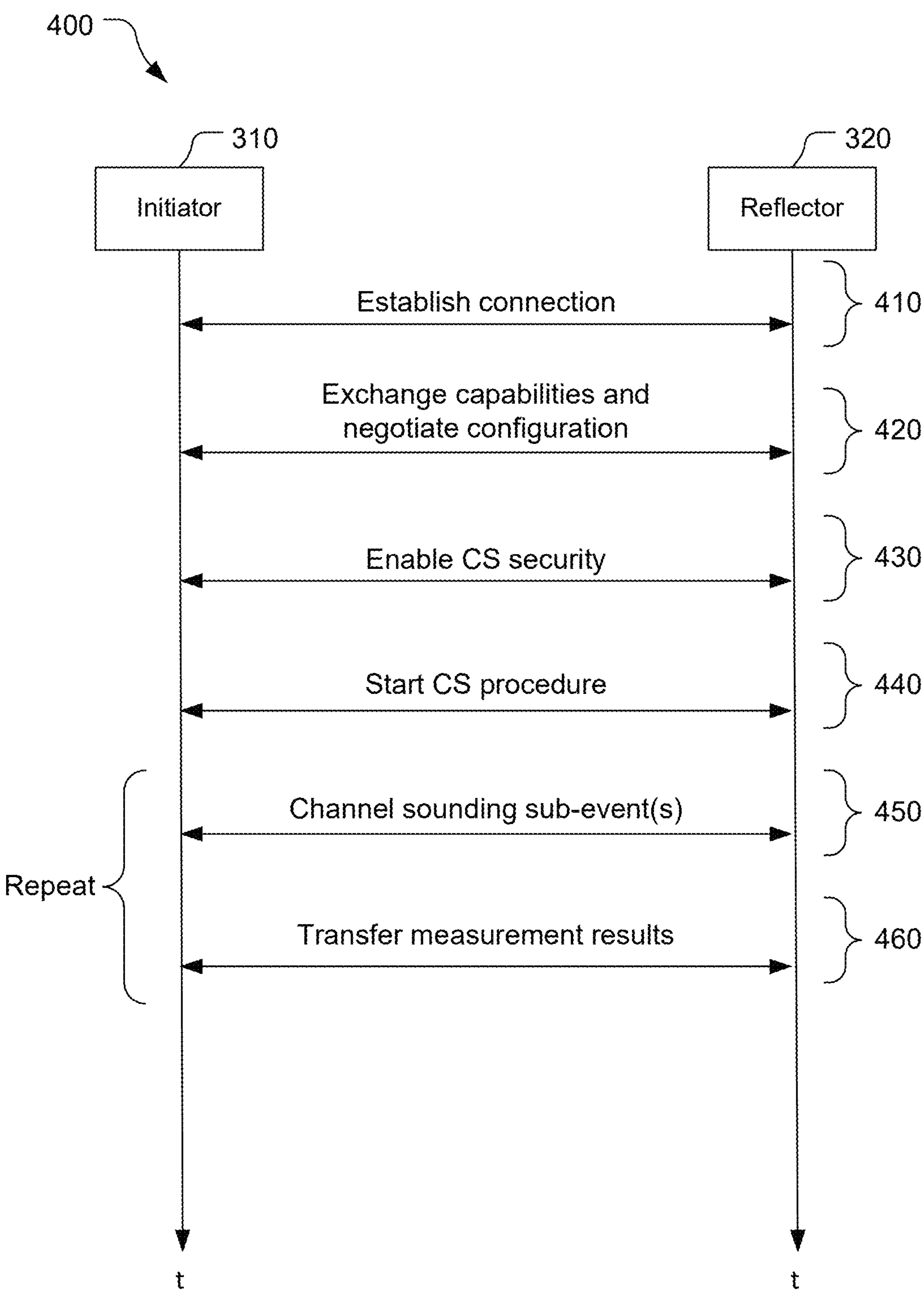
FIG. 4 is a signaling flow diagram for channel sounding.

Referring also to FIG. 4, a signal and processing flow 400 for channel sounding includes stages shown. The flow 400 is an example flow and not limiting. The flow 400 may be altered, e.g., by having one or more messages and/or one or more stages added, removed, rearranged, combined, performed concurrently, and/or having one or more messages and/or one or more stages split into multiple messages and/or stages.

At stage 410, a connection is established. For example, the initiator 310 and the reflector 320 may establish a BLUETOOTH® Low Energy connection.

At stage 420, the initiator 310 and the reflector 320 may exchange channel sounding capabilities and negotiate a configuration of signal transfer. The signal transfer configuration may be for transferring signals for phase measurement and for transferring data signals.

At stage 430, channel sounding security is established. For example, cryptographic keys may be established, e.g., using one or more known techniques as discussed in the BLUETOOTH® standard.

At stage 440, the channel sounding procedure is started. A channel as discussed below, including convolving of channels, is a transmission path for signal transfer between the initiator 310 and the reflector 320.

At stage 450, the initiator 310 and the reflector 320 carry out one or more sub-events. One or more steps (as defined above) may be performed in each sub-event. Each of the steps may have a respective, different signal frequency, with both of the signals 330, 340 having the same frequency. The reflector 320 may transfer the measurement result(s) from the reflector 320 to the initiator 310 for each sub-event, e.g., at the end of each sub-event. Some sub-events may have overlapping tones, i.e., multiple steps in different sub-events have the same signal frequency, which may help ensure the accuracy of range estimation.

At stage 460, measurement results may be transferred. Measurement results from a link layer may be sent to a host layer within the initiator 310, where a distance estimation algorithm may be performed by the processor 210 to calculate the distance 350 between the initiator 310 and the reflector 320.

Stages 450, 460 may be repeated until all requested tones (with corresponding frequencies) are completed, i.e., signals of all requested frequencies are transferred and measured.

Each of the steps in a sub-event may involve different activity depending on a mode of operation. In a mode 0, remote devices are calibrated in terms of frequency and timing at the beginning of each channel sounding step. In mode 1, RTT packets (data packets from which transmit times may be determined) are exchanged between the initiator 310 and the reflector 320 for RTT ranging. In mode 2, tones (i.e., signals of a particular frequency, with tones of different frequencies exchanged in different steps) are exchanged between the initiator 310 and the reflector 320 for RTP ranging. In mode 3, both RTT packets and tones are exchanged between the initiator 310 and the reflector 320.

Ranging with RTP includes determining an estimation of a delay corresponding to a first arrival path (FAP). The FAP may be estimated using a product channel or a root channel. The product channel is a product of a Phase Correction Term (PCT) of the first signal 330 from the initiator 310 and a PCT of the second signal 340 from the reflector 320. The root channel is a square root of the product channel and is constructed by de-convolving the product channel. The PCT is an indication of the phase information of each of the signals 330, 340 transferred between the initiator 310 and the reflector 320. The reflector 320 (e.g., the channel sounding unit 250 of the reflector 320) is configured to sample the first signal 330 to determine a channel frequency response, with a corresponding phase $\theta_{r2}$, that is an initiator PCT ($PCT_i$). The initiator 310 (e.g., the channel sounding unit 250 of the initiator 310) is configured to sample the second signal 340 to determine a channel frequency response, with a corresponding phase $\theta_{r1}$, that is a reflector PCT ($PCT_r$) from the signal 340 from the reflector 320. The reflector 320 sends the initiator PCT to the initiator 310 and the initiator 310 can determine the product channel by multiplying the initiator PCT by the reflector PCT (convolving channels, i.e., convolving the Channel Impulse Response (CIR) of the signal 330 and the CIR of the signal 340). By multiplying the PCTs of the signals 330, 340, unknown phase offsets of the radios of the initiator 310 and the reflector 320 (initial phases of the signals 330, 340) may be canceled and thus need not be known or determined. The unknown phases are corrected, leading to the name Phase Correction Term. The product channel is a convolution of two channels, a forward channel from the initiator 310 to the reflector 320 and a reverse channel from the reflector 320 to the initiator 310. The product channel is a function of the frequency of the measured tones, and a delay (of signal arrival). The delay may be estimate for different frequencies and the smallest value of the delay corresponds to the delay of the FAP.

Figure 5:
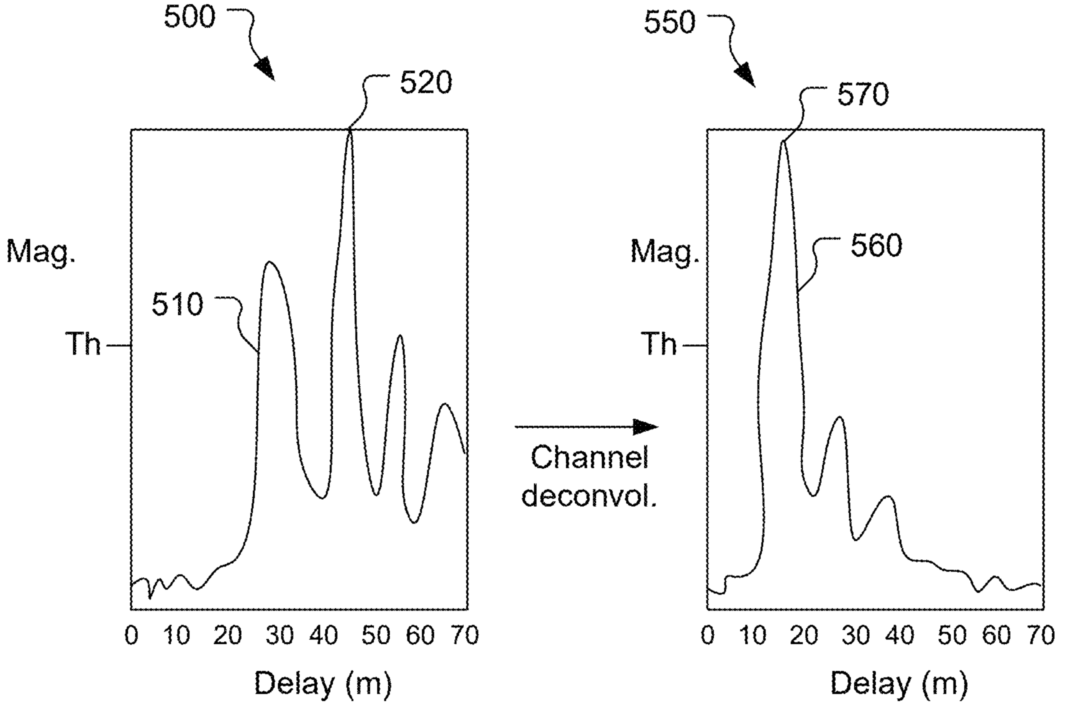
FIG. 5 is an illustration of channel impulse responses for a product channel and a root channel.

Referring also to FIG. 5, using the root channel to determine the FAP may help avoid incorrect delay determinations due to multi-path fading (destructive addition of signals). The product channel is a two-way channel whereas the root channel is a one-way channel, with it potentially being difficult to identify the FAP correctly using the product channel. For example, a graph 500 of a CIR plot 510 (Channel Impulse Response plot) of the product channel shows that the CIR of the product channel has a maximum 520 at about 44.5 m. A graph 550 of a CIR plot 560 of the root channel shows that the CIR of the root channel has a maximum 570 at about 15.3 m. The delay (in distance, here meters) of the highest peak in the CIR plot that is above a threshold magnitude (Th) is used as the distance estimation (assumed to be the delay of the FAP). The maximum 520 in the plot 510, however, is not the first peak above the threshold Th in the plot 510 and does not correspond to the FAP, whereas the maximum 570 in the plot 560 is the first peak above the threshold Th in the plot 560, and corresponds to the FAP.

The construction of the root channel, e.g., to produce the plot 560 from the product channel yielding the plot 510, involves a deconvolution process that involves solving an ambiguity for each PCT tone frequency. The product channel may be expressed as $$productPCT(k) = PCT_i(k) * PCT_r(k) \quad (1)$$

where k is the channel (frequency) number. The root channel is the square-root channel of the product channel, and can be expressed as $$rootPCT(k) = \pm\sqrt{PCT_i(k) * PCT_r(k)} \quad (2)$$

The "±" is the source of ambiguity, being equivalent to a phase rotation of π in the frequency domain (because the PCTs are complex numbers).

While extracting the FAP from the root channel provides better performance in general, the performance of the root-channel-based ranging can degrade in multipath environments. Multipath environments may lead to deep fade scenarios during which the phase behavior can change abruptly, leading to channel deconvolution errors. For example, a maximum CIR of a normalized root channel based on a product channel in which there is a deep fade (with magnitude of PCT dropping suddenly relative to frequency) may be located at an incorrect delay, e.g., due to PCT phase ambiguities being resolved incorrectly. One prior technique to handle channel deconvolution in the presence of deep fade used a one-way WiFi® channel as a reference, but this is not possible if initial transmission phase is not known (e.g., as with BCS), with a one-way channel lacking phase coherency for combining tones into a valid channel impulse response.

The channel sounding unit 250 is configured to determine ranging accurately between devices in the presence of deep fade, e.g., for BCS RTP ranging. The channel sounding unit 250 may, based on determining that a deep fade condition exists (based on the product channel as discussed below), divide an available frequency band for BCS into multiple sub-bands based on one or more deep fade levels. Different approaches may be used, e.g., by the channel sounding unit 250, to process the multiple sub-bands to produce a distance estimate (i.e., of a range between devices). The terms "distance estimate" and "range estimate" are used interchangeably herein. The root channel is determined for each of the multiple sub-bands, may be processed individually to determine multiple range estimates, and these estimates combined to determine a composite range estimate. Alternatively, the root channels for the multiple sub-bands may be processed in combination to determine the range estimate.

Figure 6:
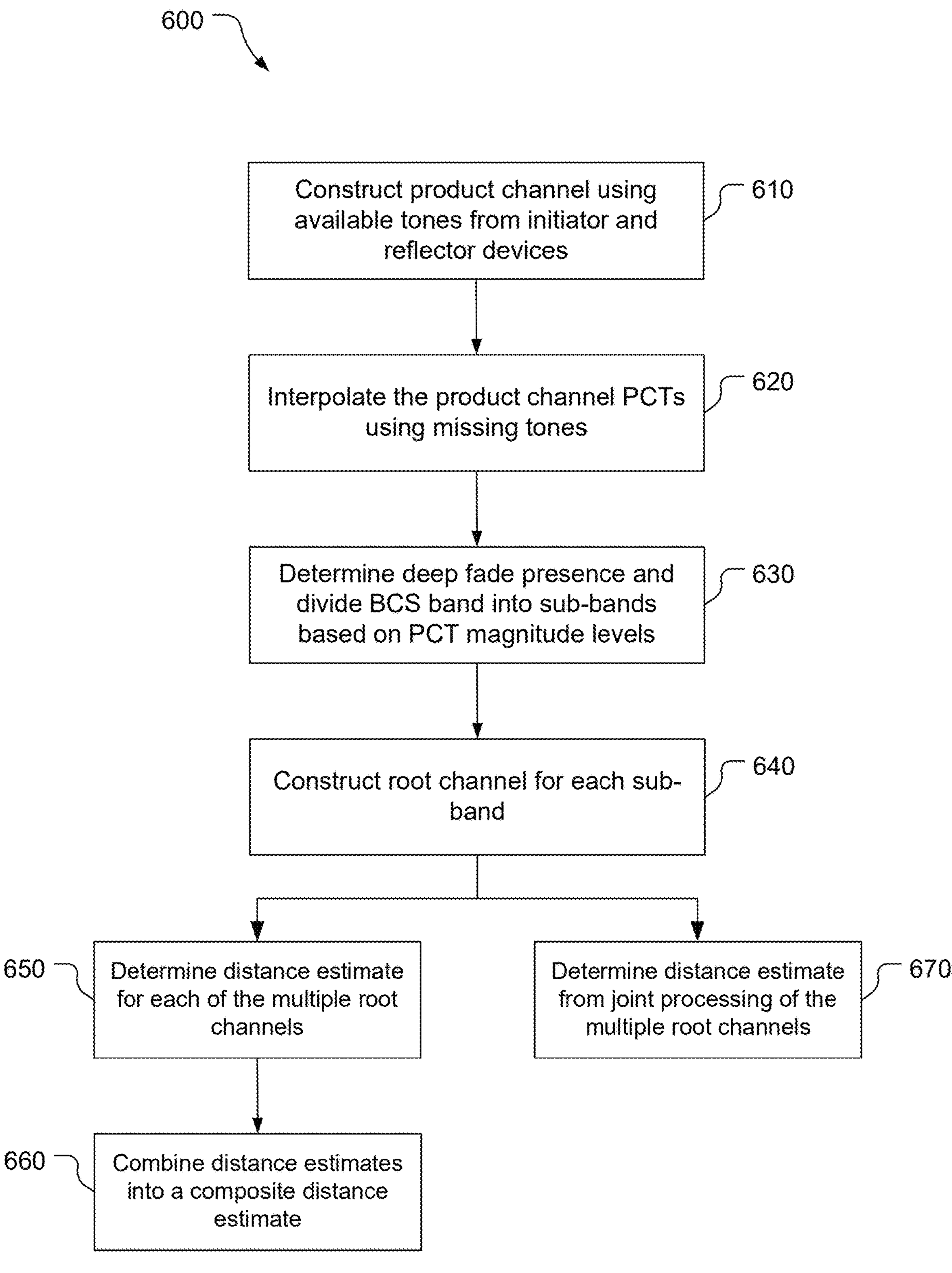
FIG. 6 is a block flow diagram of a method of determining an estimate of a distance between devices.

Referring to FIG. 6, with further reference to FIGS. 1-5, a method 600 of determining an estimate of a distance between devices includes the stages shown. The method 600 is, however, an example and not limiting. The method 600 may be altered, e.g., by having one or more stages added, removed, rearranged, combined, performed concurrently, and/or having one or more single stages split into multiple stages. For example, stage 620 may be removed. As another example, stages 650, 660 may be removed. As another example, stage 670 may be removed.

Figure 7:
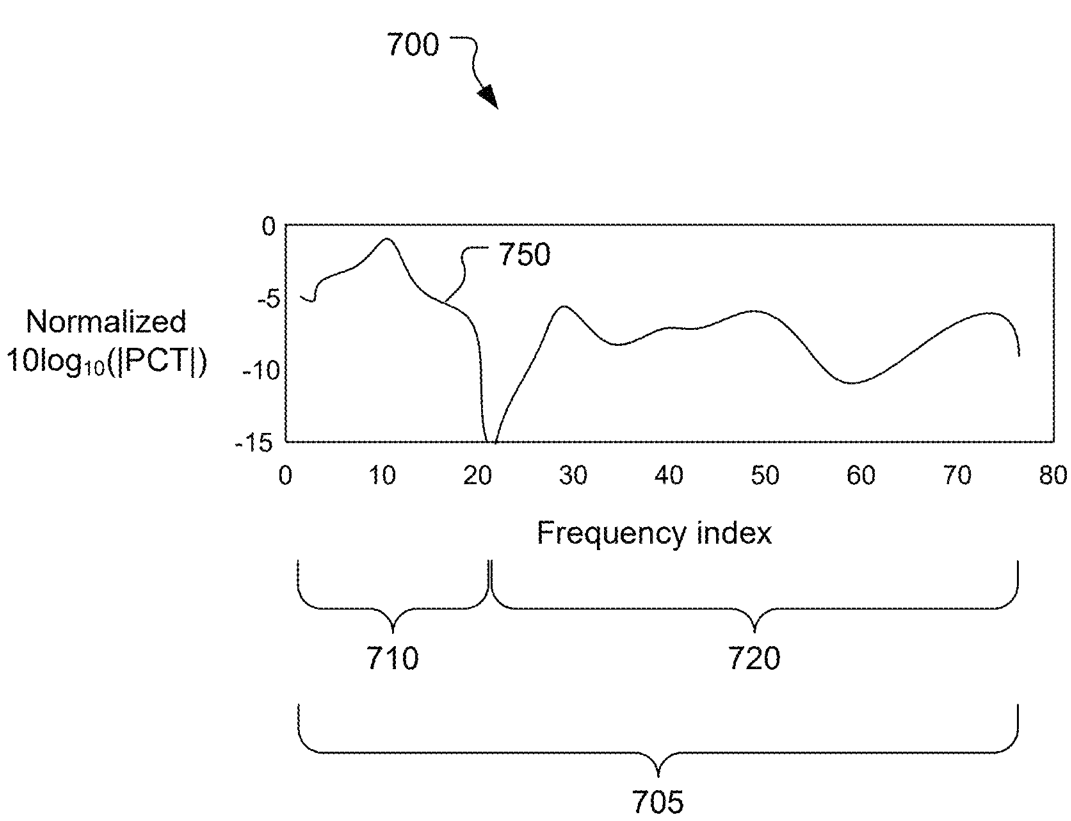
FIG. 7 is a graph of product channel magnitude as a function of frequency index.

Referring also to FIG. 7, at stage 610, the method 600 includes constructing the product channel using available tones transferred between the initiator 310 and the reflector 320. For example, the channel sounding unit 250 of the initiator 310 may produce the product channel using Equation (1), signal measurements made by the initiator 310, and signal measurement made by the reflector 320 and provided to the initiator 310. FIG. 7 shows a graph 700 of product channel magnitude as a function of frequency index over a frequency range 705 (also called a frequency band or frequency band of interest). An example product channel magnitude plot 750 shows the product channel magnitude for, in this example, the frequency range 705 from frequency index 2 to frequency index 76.

At stage 620, the method 600 includes interpolating the product channel PCTs using missing tones (i.e., tones with the frequency band of interest, e.g., the BCS band, that are not used for ranging). The product channel may be missing tones between tones of measured signals due to, e.g., frequencies within the frequency band of interest being allocated for other, non-ranging, purposes (e.g., advertising, etc.), and/or tones being unavailable for ranging for another reason (e.g., interference or not allocated for ranging). In this case, signal measurements for missing tones may be determined by interpolation using available tones.

At stage 630, the method 600 includes determining the presence of deep fade and dividing a frequency band of interest (e.g., BCS band) into sub-bands based on PCT magnitude levels. As shown in FIG. 7, a deep fade exists at frequency index 21, with the frequency range (from index 2 to index 76) divided into sub-bands 710, 720 spanning from index 2 to index 21 and from index 21 to index 76, respectively. The determination of the presence of one or more deep fades may be made based on one or more techniques.

As an example, the determination of the presence of deep fade may be based on a mean PCT magnitude value. For example, the channel sounding unit 250 may determine the tone(s) (frequency(ies)) that satisfy the following inequality $$\frac{PCT(i)}{\mathrm{mean}(|PCT|)} \leq DeepFade_{thr} \quad (3)$$

where $\mathrm{DeepFade}_{thr}$ is a threshold below which a PCT magnitude is considered to be the result of a deep fade (resulting from significant destructive addition), and mean (|PCT|) is the mean PCT value across the frequency band considered. The channel sounding unit 250 may partition the frequency band using these determined tones, e.g., by using these tones to set end points of respective sub-bands of the frequency band (with or without the tones determined to be deep-fade tones being included in the respective sub-bands).

For example, as in the example shown in FIG. 7, if the frequency band includes tones with index numbers from 2 to 76, and tone 21 is determined to be a deep-fade tone, then the channel sounding unit 250 may divide the frequency band into the sub-bands 710, 720 of index numbers 2 to 21, and 21 to 76. Alternatively, the channel sounding unit 250 may divide the frequency band into sub-bands of index numbers 2 to 20 and 22 to 76, or into sub-bands of 2 to 21 and 22 to 76, or into sub-bands of 2 to 20 and 21 to 76. A sub-band with the deep-fade tones at an end of the sub-band (and not in between ends, i.e., with one or more non-deep-fade tones on both sides of the deep-fade tone(s) as a function of frequency) can be used to determine a root channel that is correct. That is, each sub-band should not include non-deep-fade tones spanning a frequency range with one or more deep-fade tones between non-deep-fade tones.

As another example, the determination of the presence of deep fade may be based on a maximum PCT magnitude value. For example, the channel sounding unit 250 may determine the tone(s) (frequency(ies)) that satisfy the following inequality $$\frac{PCT(i)}{\max(|PCT|)} \leq DeepFade_{thr} \quad (4)$$

and partition the frequency band using these determined tones.

As another example, the determination of the presence of deep fade may be based on a median PCT magnitude value. For example, the channel sounding unit 250 may determine the tone(s) (frequency(ies)) that satisfy the following inequality $$\frac{PCT(i)}{\text{median}(|PCT|)} \leq DeepFade_{thr} \quad (5)$$

and partition the frequency band using these determined tones.

As another example, the determination of the presence of deep fade may be based on a PCT magnitude ratio of neighboring (available) tones. For example, the channel sounding unit 250 may determine the tone(s) (frequency (ies)) that satisfy either of the following inequalities $$\frac{PCT(i)}{PCT(i-1)} \leq DeepFade_{thr} \quad (6)$$

or $$\frac{PCT(i)}{PCT(i+1)} \leq DeepFade_{thr} \quad (7)$$

and partition the frequency band using these determined tones.

One or more other criteria may be used in addition to or instead of any of the above example, including any combination of two or more of the above examples. Also, the tone(s) corresponding to deep fade may be eliminated from consideration in determining a distance (range) estimate, or the tone(s) corresponding to deep fade may be considered (included in the respective sub-band(s)) in determining a distance estimate. The channel sounding unit 250 may partition the frequency band regardless of whether a contiguous set of tones (e.g., tones with index numbers from 2 to 76) is available or if only a non-contiguous set of tones (e.g., every other tone for tones with index numbers from 2 to 76) is available.

At stage 640, the method 600 includes constructing the root channel for each sub-band. The channel sounding unit 250 may deconvolve the product channel over each of the determined sub-bands. If the root channel is determined using signals spanning a deep fade, an error may occur because the sign (+) of Equation (2) changes across the deep fade (i.e., is different for deconvolutions using the sub-bands on either side of the deep fade). By limiting the root channel construction to one sub-band (i.e., a frequency band not spanning across one or more deep-fade tones, e.g., not spanning from index N−1 to N+1 where indexes N−1 and N+1 are non-deep-fade tones and index N is a deep-fade tone), the sign of Equation (2) is the same for the entire sub-band and thus will result in a correct root channel determination. Multiple options are available for determining a range estimate based on the root channels determined at stage 640, e.g., stages 650, 660 as one option and stage 670 as another option.

At stage 650, the method 600 includes determining a distance estimate (range estimate) of a distance between the initiator 310 and the reflector 320 for each of the multiple root channels determined at stage 640. The root channels determined at stage 640 are processed separately to determine a distance estimate for each root channel (e.g., by identifying the delay corresponding to the maximum CIR magnitude).

At stage 660, the method 600 includes combining the distance estimates determined at stage 650 to determine a composite distance estimate. For example, the channel sounding unit 250 may determine the composite distance estimate as a weighted average of the multiple distance estimates from the different sub-bands. The weights of the weighted average may be based on respective sub-band bandwidths. For example, the composite distance estimate may be determined according to $$dist_{comp} = \sum_{i=1}^{M} \frac{b_i}{B} d_i \quad (8)$$

where i is the sub-band number, M is the total number of sub-bands, $b_i$ is the bandwidth (e.g., in quantity of index numbers) in the $i^{th}$ sub-band, B is the total bandwidth of interest (e.g., the BCS bandwidth in index numbers), and $d_i$ is the determined distance estimate for the $i^{th}$ sub-band. For example, for a total bandwidth spanning indexes [2,76], with sub-bands being [2,50] and [51,76], a distance estimate for the first sub-band being 5.5 m and a distance estimate for the second sub-band being 6 m, the composite distance estimate is $$\frac{48}{74}5.5 + \frac{25}{74}6 = 5.59 \quad (9)$$

As another example, the channel sounding unit 250 may determine the composite distance estimate as a simple average of the distance estimates of the sub-bands. As another example, the channel sounding unit 250 may determine the composite distance estimate by selecting one of the distance estimates, e.g., based on the sub-band with the higher (or highest) power (e.g., largest number of tones)

and/or based on sub-band quality. Still other techniques for determining the composite distance estimate may be used.

At stage 670, the method 600 includes determining the composite distance estimate from joint processing of the multiple root channels. The channel sounding unit 250 may process the root channels in combination to determine the composite estimate. For example, the channel sounding unit 250 may use a super resolution technique that is tolerant of unknown phase differences between the sub-bands to fuse the sub-bands for range and multipath estimation. As another example, the channel sounding unit 250 may derive a MUSIC (MUltiple Signal Classification) spectrum (using the MUSIC algorithm) for each sub-band and multiply all the MUSIC spectra for the sub-bands to construct a unified MUSIC spectrum. The peaks of this unified spectrum could correspond to the channel delays, and the earliest delay would correspond to the range between the initiator 310 and the reflector 320. The MUSIC algorithm is a well-known algorithm for computing distance in the presence of multipath. As another example, the channel sounding unit 250 may use the well-known phase algorithm to work across multiple sub-bands to construct a gradient in terms of frequency and use the gradient to derive the range estimate. A best-fitting line (i.e., distance) across the sub-bands may be estimated such that the full phase response per band can be shifted by any amount vertically to reflect the phase discontinuity across the sub-bands.

Figure 8:
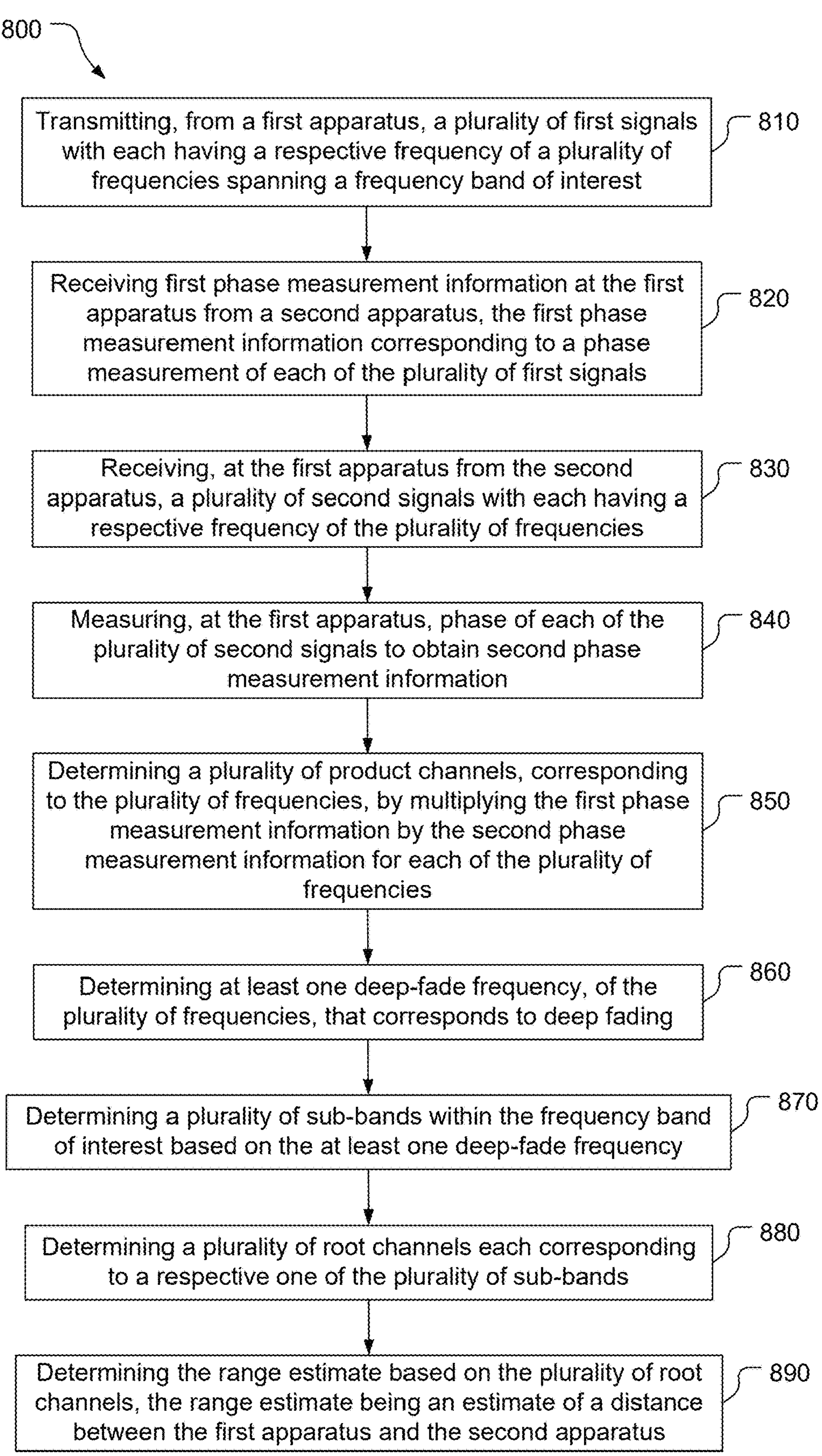
FIG. 8 is a block flow diagram of a method for determining a range estimate.

Referring to FIG. 8, with further reference to FIGS. 1-7, a method 800 for determining a range estimate includes the stages shown. The method 800 is, however, an example and not limiting. The method 800 may be altered, e.g., by having one or more stages added, removed, rearranged, combined, performed concurrently, and/or having one or more single stages split into multiple stages.

At stage 810, the method 800 includes transmitting, from a first apparatus, a plurality of first signals with each having a respective frequency of a plurality of frequencies spanning a frequency band of interest. For example, the initiator 310 may transmit the first signal 330 with each of multiple frequencies over a frequency band of interest (i.e., a corresponding frequency range). The processor 210, possibly in combination with the memory 230, in combination with the transceiver 220 (e.g., the wireless transmitter 242 and the antenna 246) may comprise means for transmitting the plurality of first signals.

At stage 820, the method 800 includes receiving first phase measurement information at the first apparatus from a second apparatus, the first phase measurement information corresponding to a phase measurement of each of the plurality of first signals. For example, the initiator 310 may receive phase measurements and/or values derived therefrom, e.g., PCTs, from the reflector 320 based on measurements of the first signals 330. The processor 210, possibly in combination with the memory 230, in combination with the transceiver 220 (e.g., the wireless receiver 244 and the antenna 246) may comprise means for receiving first phase measurement information.

At stage 830, the method 800 includes receiving, at the first apparatus from the second apparatus, a plurality of second signals with each having a respective frequency of the plurality of frequencies. For example, the initiator 310 may receive the second signal 340 from the reflector 320, with the second signals 340 having each of the frequencies of the first signals 330. The processor 210, possibly in combination with the memory 230, in combination with the transceiver 220 (e.g., the wireless receiver 244 and the antenna 246) may comprise means for receiving the plurality of second signals.

At stage 840, the method 800 includes measuring, at the first apparatus, phase of each of the plurality of second signals to obtain second phase measurement information. For example, the initiator 310 may measure the second signals 340 received from the reflector 320. The initiator 310, e.g., the channel sounding unit 250, may derive one or more quantities, e.g., PCTs, from the measurements. The processor 210, possibly in combination with the memory 230, may comprise means for measuring phase of each of the plurality of second signals.

At stage 850, the method 800 includes determining a plurality of product channels, corresponding to the plurality of frequencies, by multiplying the first phase measurement information by the second phase measurement information for each of the plurality of frequencies. For example, at stage 610 the initiator 310, e.g., the channel sounding unit 250, (and/or another device) may determine the product channel according to Equation (1) by multiplying respective PCTs determined from measurement of the first and second signals 330, 340 (multiplying each PCT determined from a first signal by the PCT determined from a second signal of the same frequency as the first signal). The processor 210, possibly in combination with the memory 230, may comprise means for determining the product channel.

At stage 860, the method 800 includes determining at least one deep-fade frequency, of the plurality of frequencies, that corresponds to deep fading. For example, at stage 630 the initiator 310, e.g., the channel sounding unit 250, (and/or another device) may analyze the product channel to determine one or more frequencies of deep fade. The processor 210, possibly in combination with the memory 230, may comprise means for determining at least one deep-fade frequency.

At stage 870, the method 800 includes determining a plurality of sub-bands within the frequency band of interest based on the at least one deep-fade frequency. For example, at stage 630 the initiator 310, e.g., the channel sounding unit 250, (and/or another device) may divide the frequency range (e.g., the frequency range 705) into sub-bands using the determined deep-fade frequency(ies) (e.g., into the sub-bands 710, 720) such that no sub-bands span across a deep-fade frequency (i.e., not sub-band includes a non-deep-fade frequency of a lower frequency than a deep-fade frequency and a non-deep-fade frequency of a higher frequency than the deep-fade frequency). The processor 210, possibly in combination with the memory 230, may comprise means for determining the plurality of sub-bands.

At stage 880, the method 800 includes determining a plurality of root channels each corresponding to a respective one of the plurality of sub-bands. For example, at stage 640 the initiator 310, e.g., the channel sounding unit 250, (and/or another device) may determine a root channel for each of the sub-bands using Equation (2). The processor 210, possibly in combination with the memory 230, may comprise means for determining the plurality of root channels.

At stage 890, the method 800 includes determining the range estimate based on the plurality of root channels, the range estimate being an estimate of a distance between the first apparatus and the second apparatus. For example, at stage 650, 660 and/or at stage 670, the initiator 310, e.g., the channel sounding unit 250, (and/or another device) may determine a composite range estimate. The processor 210, possibly in combination with the memory 230, may comprise means for determining the range estimate.

Implementations of the method 800 may include one or more of the following features. In an example implementation, the first phase measurement information comprises a first phase correction term for each of the plurality of frequencies and the second phase measurement information comprises a second phase correction term for each of the plurality of frequencies. In a further example implementation, determining the at least one deep-fade frequency comprises determining each frequency of the plurality of frequencies for which a magnitude of a corresponding one of the plurality of product channels, divided by a mean magnitude of the plurality of product channels, is no greater than a deep-fade threshold. For example, the channel sounding unit 250 may determine frequency(ies) of deep fade using inequality (3). In another further example implementation, determining the at least one deep-fade frequency comprises determining each frequency of the plurality of frequencies for which a magnitude of a corresponding one of the plurality of product channels, divided by a maximum magnitude of the plurality of product channels, is no greater than a deep-fade threshold. For example, the channel sounding unit 250 may determine frequency(ies) of deep fade using inequality (4). In another further example implementation, determining the at least one deep-fade frequency comprises determining each frequency of the plurality of frequencies for which a magnitude of a corresponding one of the plurality of product channels, divided by a median magnitude of the plurality of product channels, is no greater than a deep-fade threshold. For example, the channel sounding unit 250 may determine frequency(ies) of deep fade using inequality (5).

Also or alternatively, implementations of the method 800 may include one or more of the following features. In an example implementation, determining the plurality of sub-bands within the frequency band of interest based on the at least one deep-fade frequency comprises determining the plurality of sub-bands using the at least one deep-fade frequency to define an end of each of at least two of the sub-bands. For example, the channel sounding unit 250 may determine sub-bands to end based on (and without or without including) the deep-fade frequency(ies), e.g., as shown and described with respect to FIG. 7. In another example implementation, wherein the range estimate is a composite range estimate, and determining the range estimate based on the plurality of root channels comprises: processing each of the root channels individually to determine a plurality of intermediate distance estimates; and combining the plurality of intermediate distance estimates to determine the composite range estimate. For example, at stage 650 the channel sounding unit 250 determines a distance estimate for each root channel and at stage 660 combines the determined distances into a composite distance estimate. The processor 210, possibly in combination with the memory 230, may comprise means for processing each of the root channels individually to determine a plurality of intermediate distance estimates and means for combining the plurality of intermediate distance estimates to determine the composite range estimate. In another example implementation, determining the range estimate based on the plurality of root channels comprises jointly processing the plurality of root channels. For example, at stage 670 the channel sounding unit 250 may jointly process the root channels to determine a composite distance estimate.

IMPLEMENTATION EXAMPLES

Implementation examples are provided in the following numbered clauses.

Clause 1. A method for determining a range estimate, the method comprising:

transmitting, from a first apparatus, a plurality of first signals with each having a respective frequency of a plurality of frequencies spanning a frequency band of interest;

receiving first phase measurement information at the first apparatus from a second apparatus, the first phase measurement information corresponding to a phase measurement of each of the plurality of first signals;

receiving, at the first apparatus from the second apparatus, a plurality of second signals with each having a respective frequency of the plurality of frequencies;

measuring, at the first apparatus, phase of each of the plurality of second signals to obtain second phase measurement information;

determining a plurality of product channels, corresponding to the plurality of frequencies, by multiplying the first phase measurement information by the second phase measurement information for each of the plurality of frequencies;

determining at least one deep-fade frequency, of the plurality of frequencies, that corresponds to deep fading;

determining a plurality of sub-bands within the frequency band of interest based on the at least one deep-fade frequency;

determining a plurality of root channels each corresponding to a respective one of the plurality of sub-bands; and determining the range estimate based on the plurality of root channels, the range estimate being an estimate of a distance between the first apparatus and the second apparatus.

Clause 2. The method of clause 1, wherein the first phase measurement information comprises a first phase correction term for each of the plurality of frequencies and the second phase measurement information comprises a second phase correction term for each of the plurality of frequencies.

Clause 3. The method of clause 2, wherein determining the at least one deep-fade frequency comprises determining each frequency of the plurality of frequencies for which a magnitude of a corresponding one of the plurality of product channels, divided by a mean magnitude of the plurality of product channels, is no greater than a deep-fade threshold.

Clause 4. The method of clause 2, wherein determining the at least one deep-fade frequency comprises determining each frequency of the plurality of frequencies for which a magnitude of a corresponding one of the plurality of product channels, divided by a maximum magnitude of the plurality of product channels, is no greater than a deep-fade threshold.

Clause 5. The method of clause 2, wherein determining the at least one deep-fade frequency comprises determining each frequency of the plurality of frequencies for which a magnitude of a corresponding one of the plurality of product channels, divided by a median magnitude of the plurality of product channels, is no greater than a deep-fade threshold.

Clause 6. The method of clause 1, wherein determining the plurality of sub-bands within the frequency band of interest based on the at least one deep-fade frequency comprises determining the plurality of sub-bands using the at least one deep-fade frequency to define an end of each of at least two of the plurality of sub-bands.

Clause 7. The method of clause 1, wherein the range estimate is a composite range estimate, and determining the range estimate based on the plurality of root channels comprises:

processing each of the plurality of root channels individually to determine a plurality of intermediate distance estimates; and combining the plurality of intermediate distance estimates to determine the composite range estimate.

Clause 8. The method of clause 1, wherein determining the range estimate based on the plurality of root channels comprises jointly processing the plurality of root channels.

Clause 9. A first apparatus comprising:

at least one transceiver;

at least one memory; and at least one processor, communicatively coupled to the at least one transceiver and the at least one memory, configured to:

transmit, via the at least one transceiver, a plurality of first signals with each having a respective frequency of a plurality of frequencies spanning a frequency band of interest;

receive, via the at least one transceiver, first phase measurement information at the first apparatus from a second apparatus, the first phase measurement information corresponding to a phase measurement of each of the plurality of first signals;

receive, via the at least one transceiver from the second apparatus, a plurality of second signals with each having a respective frequency of the plurality of frequencies;

measure phase of each of the plurality of second signals to obtain second phase measurement information;

determine a plurality of product channels, corresponding to the plurality of frequencies, by multiplying the first phase measurement information by the second phase measurement information for each of the plurality of frequencies;

determine at least one deep-fade frequency, of the plurality of frequencies, that corresponds to deep fading;

determine a plurality of sub-bands within the frequency band of interest based on the at least one deep-fade frequency;

determine a plurality of root channels each corresponding to a respective one of the plurality of sub-bands; and determine a range estimate based on the plurality of root channels, the range estimate being an estimate of a distance between the first apparatus and the second apparatus.

Clause 10. The first apparatus of clause 9, wherein the first phase measurement information comprises a first phase correction term for each of the plurality of frequencies and the second phase measurement information comprises a second phase correction term for each of the plurality of frequencies.

Clause 11. The first apparatus of clause 10, wherein to determine the at least one deep-fade frequency the at least one processor is configured to determine each frequency of the plurality of frequencies for which a magnitude of a corresponding one of the plurality of product channels, divided by a mean magnitude of the plurality of product channels, is no greater than a deep-fade threshold.

Clause 12. The first apparatus of clause 10, wherein to determine the at least one deep-fade frequency the at least one processor is configured to determine each frequency of the plurality of frequencies for which a magnitude of a corresponding one of the plurality of product channels, divided by a maximum magnitude of the plurality of product channels, is no greater than a deep-fade threshold.

Clause 13. The first apparatus of clause 10, wherein to determine the at least one deep-fade frequency the at least one processor is configured to determine each frequency of the plurality of frequencies for which a magnitude of a corresponding one of the plurality of product channels, divided by a median magnitude of the plurality of product channels, is no greater than a deep-fade threshold.

Clause 14. The first apparatus of clause 9, wherein to determine the plurality of sub-bands within the frequency band of interest based on the at least one deep-fade frequency the at least one processor is configured to determine the plurality of sub-bands using the at least one deep-fade frequency to define an end of each of at least two of the plurality of sub-bands.

Clause 15. The first apparatus of clause 9, wherein the range estimate is a composite range estimate, and to determine the range estimate based on the plurality of root channels the at least one processor is configured to:

process each of the plurality of root channels individually to determine a plurality of intermediate distance estimates; and combine the plurality of intermediate distance estimates to determine the composite range estimate.

Clause 16. The first apparatus of clause 9, wherein to determine the range estimate based on the plurality of root channels the at least one processor is configured to jointly processing the plurality of root channels.

Clause 17. A first apparatus comprising:

means for transmitting a plurality of first signals with each having a respective frequency of a plurality of frequencies spanning a frequency band of interest;

means for receiving first phase measurement information from a second apparatus, the first phase measurement information corresponding to a phase measurement of each of the plurality of first signals;

means for receiving, from the second apparatus, a plurality of second signals with each having a respective frequency of the plurality of frequencies;

means for measuring phase of each of the plurality of second signals to obtain second phase measurement information;

means for determining a plurality of product channels, corresponding to the plurality of frequencies, by multiplying the first phase measurement information by the second phase measurement information for each of the plurality of frequencies;

means for determining at least one deep-fade frequency, of the plurality of frequencies, that corresponds to deep fading;

means for determining a plurality of sub-bands within the frequency band of interest based on the at least one deep-fade frequency;

means for determining a plurality of root channels each corresponding to a respective one of the plurality of sub-bands; and means for determining a range estimate based on the plurality of root channels, the range estimate being an estimate of a distance between the first apparatus and the second apparatus.

Clause 18. The first apparatus of clause 17, wherein the first phase measurement information comprises a first phase correction term for each of the plurality of frequencies and the second phase measurement information comprises a second phase correction term for each of the plurality of frequencies.

Clause 19. The first apparatus of clause 18, wherein the means for determining the at least one deep-fade frequency comprise means for determining each frequency of the plurality of frequencies for which a magnitude of a corresponding one of the plurality of product channels, divided by a mean magnitude of the plurality of product channels, is no greater than a deep-fade threshold.

Clause 20. The first apparatus of clause 18, wherein the means for determining the at least one deep-fade frequency comprise means for determining each frequency of the plurality of frequencies for which a magnitude of a corresponding one of the plurality of product channels, divided by a maximum magnitude of the plurality of product channels, is no greater than a deep-fade threshold.

Clause 21. The first apparatus of clause 18, wherein the means for determining the at least one deep-fade frequency comprise means for determining each frequency of the plurality of frequencies for which a magnitude of a corresponding one of the plurality of product channels, divided by a median magnitude of the plurality of product channels, is no greater than a deep-fade threshold.

Clause 22. The first apparatus of clause 17, wherein the means for determining the plurality of sub-bands within the frequency band of interest based on the at least one deep-fade frequency comprise means for determining the plurality of sub-bands using the at least one deep-fade frequency to define an end of each of at least two of the plurality of sub-bands.

Clause 23. The first apparatus of clause 17, wherein the range estimate is a composite range estimate, and the means for determining the range estimate based on the plurality of root channels comprise:

means for processing each of the plurality of root channels individually to determine a plurality of intermediate distance estimates; and means for combining the plurality of intermediate distance estimates to determine the composite range estimate.

Clause 24. The first apparatus of clause 17, wherein the means for determining the range estimate based on the plurality of root channels comprise means for jointly processing the plurality of root channels.

Clause 25. A non-transitory, processor-readable storage medium comprising processor-readable instructions to cause at least one processor of a first apparatus to:

transmit a plurality of first signals with each having a respective frequency of a plurality of frequencies spanning a frequency band of interest;

receive first phase measurement information from a second apparatus, the first phase measurement information corresponding to a phase measurement of each of the plurality of first signals;

receive, from the second apparatus, a plurality of second signals with each having a respective frequency of the plurality of frequencies;

measure phase of each of the plurality of second signals to obtain second phase measurement information;

determine a plurality of product channels, corresponding to the plurality of frequencies, by multiplying the first phase measurement information by the second phase measurement information for each of the plurality of frequencies;

determine at least one deep-fade frequency, of the plurality of frequencies, that corresponds to deep fading;

determine a plurality of sub-bands within the frequency band of interest based on the at least one deep-fade frequency;

determine a plurality of root channels each corresponding to a respective one of the plurality of sub-bands; and determine a range estimate based on the plurality of root channels, the range estimate being an estimate of a distance between the first apparatus and the second apparatus.

Clause 26. The non-transitory, processor-readable storage medium of clause 25, wherein the first phase measurement information comprises a first phase correction term for each of the plurality of frequencies and the second phase measurement information comprises a second phase correction term for each of the plurality of frequencies.

Clause 27. The non-transitory, processor-readable storage medium of clause 26, wherein the processor-readable instructions to cause the at least one processor to determine the at least one deep-fade frequency comprise processor-readable instructions to cause the at least one processor to determine each frequency of the plurality of frequencies for which a magnitude of a corresponding one of the plurality of product channels, divided by a mean magnitude of the plurality of product channels, is no greater than a deep-fade threshold.

Clause 28. The non-transitory, processor-readable storage medium of clause 26, wherein the processor-readable instructions to cause the at least one processor to determine the at least one deep-fade frequency comprise processor-readable instructions to cause the at least one processor to determine each frequency of the plurality of frequencies for which a magnitude of a corresponding one of the plurality of product channels, divided by a maximum magnitude of the plurality of product channels, is no greater than a deep-fade threshold.

Clause 29. The non-transitory, processor-readable storage medium of clause 26, wherein the processor-readable instructions to cause the at least one processor to determine the at least one deep-fade frequency comprise processor-readable instructions to cause the at least one processor to determine each frequency of the plurality of frequencies for which a magnitude of a corresponding one of the plurality of product channels, divided by a median magnitude of the plurality of product channels, is no greater than a deep-fade threshold.

Clause 30. The non-transitory, processor-readable storage medium of clause 25, wherein the processor-readable instructions to cause the at least one processor to determining the plurality of sub-bands within the frequency band of interest based on the at least one deep-fade frequency comprise processor-readable instructions to cause the at least one processor to determine the plurality of sub-bands using the at least one deep-fade frequency to define an end of each of at least two of the plurality of sub-bands.

Clause 31. The non-transitory, processor-readable storage medium of clause 25, wherein the range estimate is a composite range estimate, and the processor-readable instructions to cause the at least one processor to determine the range estimate based on the plurality of root channels comprise processor-readable instructions to cause the at least one processor to:

process each of the plurality of root channels individually to determine a plurality of intermediate distance estimates; and combine the plurality of intermediate distance estimates to determine the composite range estimate.

Clause 32. The non-transitory, processor-readable storage medium of clause 25, wherein the processor-readable instructions to cause the at least one processor to determine the range estimate based on the plurality of root channels comprise processor-readable instructions to cause the at least one processor to jointly process the plurality of root channels.

OTHER CONSIDERATIONS

Other examples and implementations are within the scope of the disclosure and appended claims. For example, features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices. The phrases "at least one" and "one or more" are used interchangeably and such that "at least one" referred-to object and "one or more" referred-to objects include implementations that have one referred-to object and implementations that have multiple referred-to objects. For example, "at least one device" and "one or more devices" each includes implementations that have one device and implementations that have multiple devices.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of +20% or +10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of +20% or +10%, +5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for determining a range estimate, the method comprising:

transmitting, from a first apparatus, a plurality of first signals with each having a respective frequency of a plurality of frequencies spanning a frequency band of interest;

receiving first phase measurement information at the first apparatus from a second apparatus, the first phase measurement information corresponding to a phase measurement of each of the plurality of first signals;

receiving, at the first apparatus from the second apparatus, a plurality of second signals with each having a respective frequency of the plurality of frequencies;

measuring, at the first apparatus, phase of each of the plurality of second signals to obtain second phase measurement information;

determining a plurality of product channels, corresponding to the plurality of frequencies, by multiplying the first phase measurement information by the second phase measurement information for each of the plurality of frequencies;

determining at least one deep-fade frequency, of the plurality of frequencies, that corresponds to deep fading;

determining a plurality of sub-bands within the frequency band of interest based on the at least one deep-fade frequency;

determining a plurality of root channels each corresponding to a respective one of the plurality of sub-bands; and determining the range estimate based on the plurality of root channels, the range estimate being an estimate of a distance between the first apparatus and the second apparatus.

2. The method of claim 1, wherein the first phase measurement information comprises a first phase correction term for each of the plurality of frequencies and the second phase measurement information comprises a second phase correction term for each of the plurality of frequencies.

3. The method of claim 2, wherein determining the at least one deep-fade frequency comprises determining each frequency of the plurality of frequencies for which a magnitude of a corresponding one of the plurality of product channels, divided by a mean magnitude of the plurality of product channels, is no greater than a deep-fade threshold.

4. The method of claim 2, wherein determining the at least one deep-fade frequency comprises determining each frequency of the plurality of frequencies for which a magnitude of a corresponding one of the plurality of product channels, divided by a maximum magnitude of the plurality of product channels, is no greater than a deep-fade threshold.

5. The method of claim 2, wherein determining the at least one deep-fade frequency comprises determining each frequency of the plurality of frequencies for which a magnitude of a corresponding one of the plurality of product channels, divided by a median magnitude of the plurality of product channels, is no greater than a deep-fade threshold.

6. The method of claim 1, wherein determining the plurality of sub-bands within the frequency band of interest based on the at least one deep-fade frequency comprises determining the plurality of sub-bands using the at least one deep-fade frequency to define an end of each of at least two of the plurality of sub-bands.

7. The method of claim 1, wherein the range estimate is a composite range estimate, and determining the range estimate based on the plurality of root channels comprises:

processing each of the plurality of root channels individually to determine a plurality of intermediate distance estimates; and combining the plurality of intermediate distance estimates to determine the composite range estimate.

8. The method of claim 1, wherein determining the range estimate based on the plurality of root channels comprises jointly processing the plurality of root channels.

9. A first apparatus comprising:

at least one transceiver;

at least one memory; and at least one processor, communicatively coupled to the at least one transceiver and the at least one memory, configured to:

transmit, via the at least one transceiver, a plurality of first signals with each having a respective frequency of a plurality of frequencies spanning a frequency band of interest;

receive, via the at least one transceiver, first phase measurement information at the first apparatus from a second apparatus, the first phase measurement information corresponding to a phase measurement of each of the plurality of first signals;

receive, via the at least one transceiver from the second apparatus, a plurality of second signals with each having a respective frequency of the plurality of frequencies;

measure phase of each of the plurality of second signals to obtain second phase measurement information;

determine a plurality of product channels, corresponding to the plurality of frequencies, by multiplying the first phase measurement information by the second phase measurement information for each of the plurality of frequencies;

determine at least one deep-fade frequency, of the plurality of frequencies, that corresponds to deep fading;

determine a plurality of sub-bands within the frequency band of interest based on the at least one deep-fade frequency;

determine a plurality of root channels each corresponding to a respective one of the plurality of sub-bands; and determine a range estimate based on the plurality of root channels, the range estimate being an estimate of a distance between the first apparatus and the second apparatus.

10. The first apparatus of claim 9, wherein the first phase measurement information comprises a first phase correction term for each of the plurality of frequencies and the second phase measurement information comprises a second phase correction term for each of the plurality of frequencies.

11. The first apparatus of claim 10, wherein to determine the at least one deep-fade frequency the at least one processor is configured to determine each frequency of the plurality of frequencies for which a magnitude of a corresponding one of the plurality of product channels, divided by a mean magnitude of the plurality of product channels, is no greater than a deep-fade threshold.

12. The first apparatus of claim 10, wherein to determine the at least one deep-fade frequency the at least one processor is configured to determine each frequency of the plurality of frequencies for which a magnitude of a corresponding one of the plurality of product channels, divided by a maximum magnitude of the plurality of product channels, is no greater than a deep-fade threshold.

13. The first apparatus of claim 10, wherein to determine the at least one deep-fade frequency the at least one processor is configured to determine each frequency of the plurality of frequencies for which a magnitude of a corresponding one of the plurality of product channels, divided by a median magnitude of the plurality of product channels, is no greater than a deep-fade threshold.

14. The first apparatus of claim 9, wherein to determine the plurality of sub-bands within the frequency band of interest based on the at least one deep-fade frequency the at least one processor is configured to determine the plurality of sub-bands using the at least one deep-fade frequency to define an end of each of at least two of the plurality of sub-bands.

15. The first apparatus of claim 9, wherein the range estimate is a composite range estimate, and to determine the range estimate based on the plurality of root channels the at least one processor is configured to:

process each of the plurality of root channels individually to determine a plurality of intermediate distance estimates; and combine the plurality of intermediate distance estimates to determine the composite range estimate.

16. The first apparatus of claim 9, wherein to determine the range estimate based on the plurality of root channels the at least one processor is configured to jointly processing the plurality of root channels.

17. A first apparatus comprising:

means for transmitting a plurality of first signals with each having a respective frequency of a plurality of frequencies spanning a frequency band of interest;

means for receiving first phase measurement information from a second apparatus, the first phase measurement information corresponding to a phase measurement of each of the plurality of first signals;

means for receiving, from the second apparatus, a plurality of second signals with each having a respective frequency of the plurality of frequencies;

means for measuring phase of each of the plurality of second signals to obtain second phase measurement information;

means for determining a plurality of product channels, corresponding to the plurality of frequencies, by multiplying the first phase measurement information by the second phase measurement information for each of the plurality of frequencies;

means for determining at least one deep-fade frequency, of the plurality of frequencies, that corresponds to deep fading;

means for determining a plurality of sub-bands within the frequency band of interest based on the at least one deep-fade frequency;

means for determining a plurality of root channels each corresponding to a respective one of the plurality of sub-bands; and means for determining a range estimate based on the plurality of root channels, the range estimate being an estimate of a distance between the first apparatus and the second apparatus.

18. The first apparatus of claim 17, wherein the first phase measurement information comprises a first phase correction term for each of the plurality of frequencies and the second phase measurement information comprises a second phase correction term for each of the plurality of frequencies.

19. The first apparatus of claim 18, wherein the means for determining the at least one deep-fade frequency comprise means for determining each frequency of the plurality of frequencies for which a magnitude of a corresponding one of the plurality of product channels, divided by a mean magnitude of the plurality of product channels, is no greater than a deep-fade threshold.

20. The first apparatus of claim 18, wherein the means for determining the at least one deep-fade frequency comprise means for determining each frequency of the plurality of frequencies for which a magnitude of a corresponding one of the plurality of product channels, divided by a maximum magnitude of the plurality of product channels, is no greater than a deep-fade threshold.

* * * * *